G. M. S. TAIT.
SCRUBBER AND METHOD OF MINGLING GAS AND LIQUID AND CREATING PRESSURE IN THE GAS.
APPLICATION FILED JUNE 17, 1908.
992,081. Patented May 9, 1911.
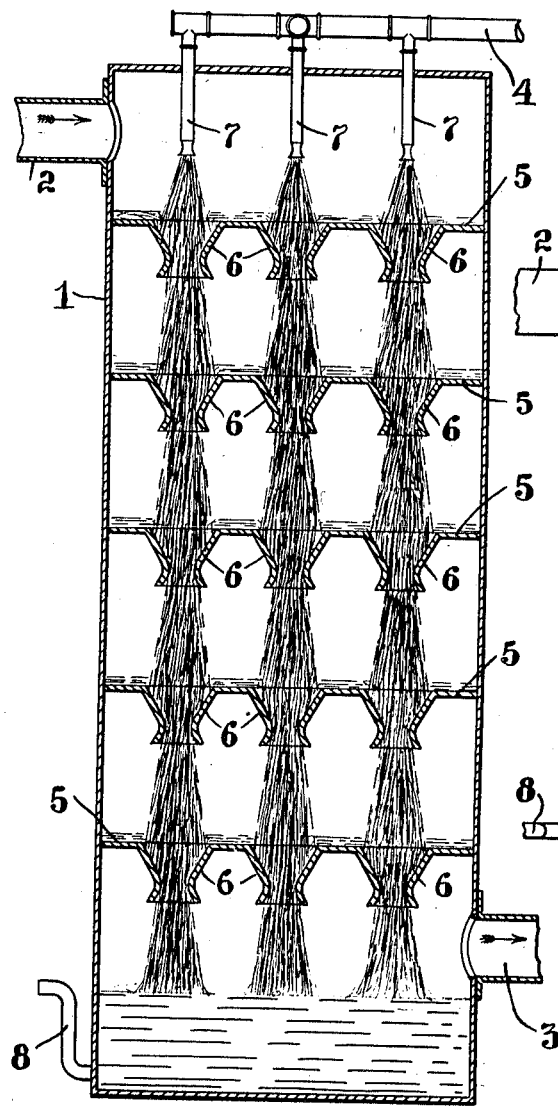
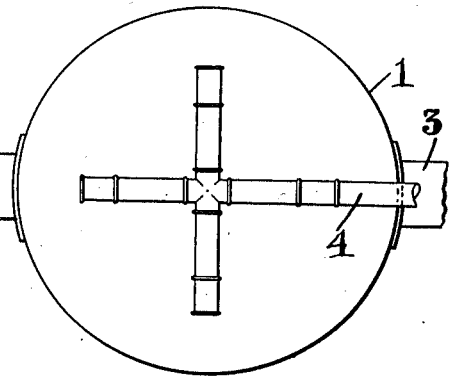
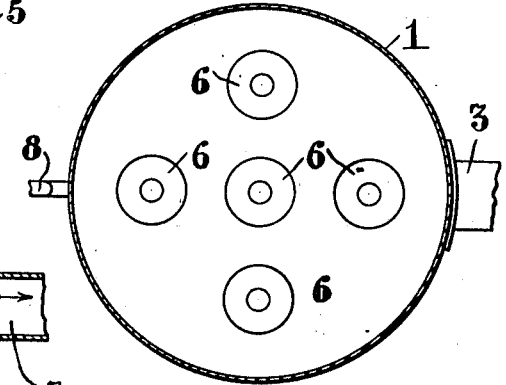

United States Patent Office.

GODFREY M. S. TAIT, OF MONTCLAIR, NEW JERSEY, ASSIGNOR TO GAS POWER COMPANY, OF NEW YORK, N. Y., A CORPORATION OF NEW YORK.

SCRUBBER AND METHOD OF MINGLING GAS AND LIQUID AND CREATING PRESSURE IN THE GAS.

992,081.

Specification of Letters Patent.

Patented May 9, 1911.

Application filed June 17, 1908. Serial No. 439,017.

*To all whom it may concern:*

Be it known that I, GODFREY M. S. TAIT, a citizen of Great Britain, and a resident of Montclair, county of Essex, and State of New Jersey, have invented certain new and useful Improvements in Scrubbers and in Methods of Mingling Gas and Liquid and Creating Pressure in the Gas, of which the following is a specification.

My invention relates to improvements in gas scrubbers; which term I here employ as generic to devices for washing or "scrubbing" gas, air and the like, or for bringing gas and a liquid into intimate contact.

Scrubbers are commonly used for cooling and cleansing from gritty and other impurities, producer gas, water gas, and the like. In the case of gas-power plants where a gas producer supplies gas to an explosion or gas engine, a scrubber is usually interposed between the producer and the engine. For various well known reasons it is desirable to operate the producer under more or less suction, while it is desirable to supply the gas to the engine under more or less pressure. To this end it has been common in the past to employ, in connection with the scrubber, a fan, blower or the like, which will produce the desirable suction in the producer and the desirable pressure in the engine supply pipe.

In the scrubber which forms the subject matter of my present invention, I have utilized the action of the water itself to produce suction at one end of the scrubber and pressure at the other end thereof, the scrubber comprising what corresponds to a plurality of fluid-operated ejectors which not only serve to mix the gas and liquid efficiently, but also to produce suction on one side and pressure on the other. Since such ejectors are in general incapable of producing a considerable pressure difference, when operating in single stages, without requiring a large flow of water at considerable pressure, I have provided a plurality of such ejectors arranged in series, so that the cumulative effect of the action of the several ejectors is produced. In this way I avoid the use of a separate gas blower or fan with attendant complications and, usually, the necessity of providing auxiliary motors and at the same time make the apparatus substantially automatic when water under the small head required for the apparatus is available.

The objects of my invention are to improve and simplify the construction of scrubbers, to provide for very efficient scrubbing of the gas, to produce suction in the gas supply pipe and pressure in the gas discharge pipe without the use of separate blowing apparatus, to avoid the use of moving parts and generally to make the scrubber compact, efficient and economical.

In the accompanying drawings: Figure 1 shows a central vertical section of a scrubber embodying my invention; Fig. 2 shows a top view thereof; and Fig. 3 a horizontal section thereof.

In the drawings, 1 designates the shell of the scrubber, 2 a gas inlet pipe, 3 a gas outlet pipe, and 4 a water supply pipe. The interior of the scrubber is divided into a plurality of chambers by means of transverse partitions 5 and each partition is provided with a plurality of ejector nozzles 6 of the familiar reverse-tapering form. The said nozzles of the different partitions are preferably located one beneath another so that the streams of water discharged from the nozzles of one partition pass directly to the nozzles of the next partition and so on. The water supply pipe 4 is provided with a plurality of nozzles 7 adapted to project spray-jets of water into the nozzles of the first transverse partition. At the bottom of the scrubber there is the usual water discharge pipe 8. It will be obvious that either the water should be supplied to the pipe 4 under pressure from some suitable independent source, or that there should be suitable circulating arrangements whereby water drawn from the lower portion of the scrubber may be returned to the upper portion thereof.

The operation of this scrubber is as follows: Water flowing from the nozzles 7 into the ejector nozzles 6 of the first partition, induces a flow of the gas from pipe 2 during its passage through the nozzle 6 of the first series, the pressure in the second chamber (from the top) of the scrubber being therefore somewhat higher than in the top chamber. In the process of drawing the gas downward through the first series of nozzles the gas and water are very thoroughly mingled. In the succeeding chambers and nozzles of the apparatus the same action takes place, the pressure in each chamber being somewhat greater than that in the chamber above, so that there may be suction in pipe 2 and pressure in pipe 3. While the pressure difference between any two chambers may be relatively small, the cumulative effect may be considerable, as there may be as many chambers in series and ejector nozzles as desired.

In the operation of gas power plants where a separate blower or fan is provided, one trouble has been that it has been substantially necessary to drive this blower or fan by an independent motor in order to supply the draft through the producer necessary when starting up and in order to maintain draft through the producer when the engine is shut down. Auxiliary power is not always readily available and the necessity of using auxiliary power is in most cases to be avoided if possible. It will be observed that this scrubber requires merely the turning on of the water to start it in operation as a draft producing apparatus. My invention also comprises the processes of creating a pressure differential between the incoming and outgoing streams of gas and of mingling the gas and liquid carried out by the above apparatus involving the subjection of the gas current to the successive action of a plurality of streams or spray jets of liquid, each such action adding to the difference of pressure between the incoming and outgoing gas streams.

What I claim is:—

1. A combined scrubber and flow producing apparatus comprising a plurality of chambers at progressively lower levels, and in gravity-flow relation to one another, and liquid-operated gas-eduction means, connecting said chambers in succession, the uppermost chamber only having means for the supply of gas, and means for the supply of liquid for operating such eduction means, the last of said chambers having means for the escape of gas and for the discharge of the liquid, each intermediate chamber being closed except as to the eduction means connecting such chamber with the adjacent chambers.

2. A combined scrubber and flow producing apparatus comprising a plurality of chambers located one above another, and liquid operated gas eduction means, connecting said chambers in succession, the first of said chambers having means for the supply of gas, and means for the supply of liquid for operating such eduction means, the last of said chambers having means for the escape of gas and for the discharge of the liquid, the intermediate chamber being closed except as to the eduction means connecting such chamber with the adjacent chambers, the eduction means of chambers other than the first arranged to operate upon the liquid discharged from the eduction means of the preceding chamber.

3. A combined scrubber and flow-producing apparatus comprising a plurality of chambers arranged one above another, and eduction-nozzles extending downward from each upper chamber to the chamber beneath, such eduction means of each chamber arranged in the path of the liquid discharged from the eduction means of the preceding chamber, the uppermost chamber having means for the supply of gas, the last chamber having means for the escape of gas, each intermediate chamber closed except for its connection by such gas eduction means to the adjacent chambers, and liquid supply means for the eduction means of the uppermost chamber.

4. The herein described method of mingling gas and liquid and inducing flow of gas, which consists in passing a body of liquid successively through a plurality of chambers maintained at progressively higher pressures, maintaining such pressures in said chambers by the action of such moving body of liquid, and subjecting gas in the first such chamber to educting action produced by such moving body of liquid, and thereby drawing the gas into the succeeding chamber, and in succeeding chambers repeating such eduction action of the moving liquid on the gas at the progressively increasing pressures existing in such chambers.

In testimony whereof I have signed this specification in the presence of two subscribing witnesses.

GODFREY M. S. TAIT.

Witnesses:
H. M. MARBLE,
FRANK E. RAFFMAN.